United States Patent [19]
Goodger, Sr.

[11] Patent Number: 5,901,668
[45] Date of Patent: May 11, 1999

[54] ANIMAL LEASH FOR MULTIPLE ANIMALS

[76] Inventor: Kermit E. Goodger, Sr., 9200 E Parkhill Dr., Bethesda, Md. 20814

[21] Appl. No.: 08/649,234
[22] Filed: May 17, 1996
[51] Int. Cl.⁶ .................................................. A01K 27/00
[52] U.S. Cl. .............................................................. 119/795
[58] Field of Search .................................. 119/792, 770, 119/795, 797, 798

[56] References Cited

U.S. PATENT DOCUMENTS

| D. 244,869 | 6/1977 | Manley et al. | D30/153 |
|---|---|---|---|
| 1,505,423 | 8/1924 | Prouty et al. | 119/795 X |
| 4,003,154 | 1/1977 | Carver | 43/42.13 |
| 4,638,764 | 1/1987 | Anderson | 119/770 |
| 4,879,972 | 11/1989 | Crowe et al. | 119/792 |
| 5,551,379 | 9/1996 | Hart | 119/771 |

FOREIGN PATENT DOCUMENTS

| 63780 | 3/1914 | Austria | 119/795 |
|---|---|---|---|

Primary Examiner—Gene Mancene
Assistant Examiner—Yvonne R. Abbott
Attorney, Agent, or Firm—John P. Halvonik

[57] ABSTRACT

A leash having a swiveling connective portion for restraint of multiple animals on the same leash. The swiveling clamp is a connective portion to connect the main line, held by the animal handler to each of the sub lines that in turn connect to the collar of each animal. Each of the sub-lines is connected to the clamp by a clip or some other arrangement that allows each of the connections to move somewhat along the base of the triangular clamp and so spread themselves apart from another as the animals move. The clamp has a roughly triangular shape with the wider base of the triangle at that the end that connects to the multiple clips of each of the sub lines. Those two points of the triangle at the base may be curved in order to prevent the clips from riding up on the clamp and so interfering with one another. The handle end of the main line may be padded so that the handler of the animals can hold the line comfortably.

1 Claim, 1 Drawing Sheet

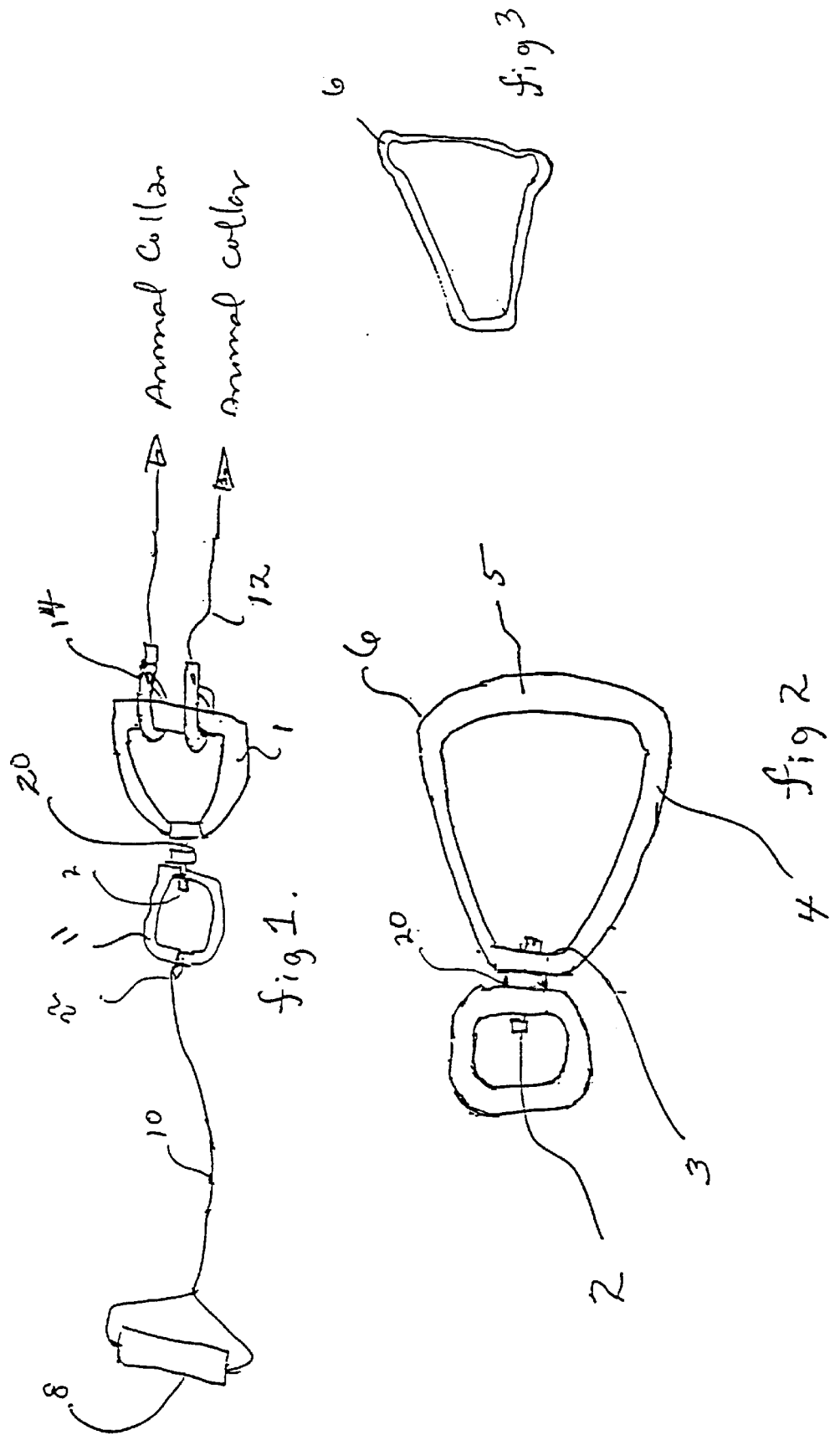

ANIMAL LEASH FOR MULTIPLE ANIMALS

FIELD OF THE INVENTION

The invention relates to the field of animal restraints and in particular, to an animal leash having a swiveling arrangement in order to rotate that portion of the leash having multiple lines that connect to each of the collars on the animals. A swiveling arrangement will prevent the multiple leashes from entangling with one another so that more than one dog or other animal may be walked with the handler only having to hold onto one main leash.

BACKGROUND OF INVENTION

Today, more than ever, pets travel with their masters. Going for a walk with one's pet is a joy for both master and the pet. Oftentimes, dogs among other pets, travel by car and air and are allowed to stay in motels and hotels in ever increasing numbers. It is believed that a leash that folds easily and fits in a small area in the master's suit case is very desirable for a morning or afternoon walk while on vacation.

While there have been leashes, such as dog leashes that use a swiveling connection to hold more than one leash connection such as US Pat. No. 4879972, to Crowe, none of the prior art is known to use the applicant's specially shaped swiveling portion that is of a generally triangular shape that prevents the multiple connections to each of the leashes from riding up along this swiveling part and thus entangling with one another.

It is believed that the use of such a specially shaped connection will prevent the multiple lines from entangling with one another and thus allow the handler to hold several animals, such as dogs on the same leash without the lines entangling or otherwise interfering with the smooth rotation of the swiveling connection.

SUMMARY OF THE INVENTION

A leash having a swiveling connective portion for restraint of multiple animals on the same leash. There is a main line that is held by the handler having, at one end, a padded handle for holding in the hand, and, at the other end, a connection with one end of the swiveling portion. Sub lines in connection with each of the animals are connected to the other end of the swiveling portion. The swiveling portion is generally of the shape of a parallelogram having a short side and a long side opposite the short side. The longer side is to be attached to connecting clips at the end of each of the sub lines and is curved so that it can accommodate multiple clips from each of the leashes. The shorter side of the parallelogram is connected to the main line through a smaller ring that swivels. The shape of the swiveling connection keeps the sub lines spaced apart from one another and to prevent the sub lines from riding up on the swivel and so interfering with one another.

Each of sub lines that is connected to the collar of the animal or, perhaps, some other animal engaging portion. The swiveling clamp will swivel as the animals move and thus prevent each of the sub lines from entangling with one another. The special shape of the swivel will prevent each of the sub lines from riding up on the swivel and thus minimize the chances that they can interfere with one another. The handle end of the main line may be padded so that the handler of the animals can hold the line comfortably.

It is an objective of the invention to provide a leash having a main line and a swiveling connection that may be connected to several lines, each of which is in turn connected to the collar of animal, so that the handler may control multiple animals by one main line held in the hand.

Another objective is to provide an animal leash for multiple animals that will not entangle the lines or otherwise interfere with the smooth swiveling or the connective portion.

Other objectives will become known to those skilled in the art once the method is described.

DESCRIPTION OF THE DRAWINGS

FIG. 1 Shows overall arrangement;

FIG. 2 detail of the specially shaped swiveling connection;

FIG. 3 detail of corner of swivel.

DESCRIPTION OF PREFERRED EMBODIMENT

The overall arrangement of the invention is as shown in FIG. 1. The main line 10 is connected at one end to a handle 8. The handle may be padded in order to insure comfort to the hand. The handle is held by the user and the other end of the main line is connected to a small ring or similar portion 11. The swiveling portion 1 is connected to ring 11 by a e.g. a rivet 2 or other rotating connection that allows the ring and the swiveling portion 1 to rotate with respect to one another. A detachable clip 22 or similar connection may be used to connect the main line to the ring.

Sub lines 12 are used to connect each of the collars on the animals to the swiveling portion 1. If the leash is used to hold say, four dogs, there would four sub-lines, each going to a dog collar on each of the animals. The sub lines may be of rope, metal chain, etc. Collars are believed to be the most commonly used method of attaching the sub line to the animal but other means may be used, for example the sub line could be connected to a harness that engages around the body of the animal.

It is believed that any sort of animal engaging device may be used provided that they can be connected to the swiveling clamp by a line. The main line as well as the sub lines (or pet lines) should be made of the same material. The lines should be made of flexible durable materials that can withstand the pull of, say, four 90 lb. dogs. Ropes found in use on boats are believed to be useful in this regard.

Each of the sub-lines may be connected to the swiveling portion by a detachable clip 14 or some other arrangement that will allow this connection to travel somewhat along the swiveling portion 1. The swiveling portion is shown in detail in FIG. 2 and may be described as roughly that of a trapezoid having four sides including a base side 5, a top side 3, each of different lengths, and two sides 4 of equal length. The base side should be longer than the top side. Preferably, each of the corners 6, where the base meets the sides, should be slightly rounded in order to prevent the clips 14 from getting hung up there. There may be a washer 20 between the swiveling portion and the ring in order to facilitate this rotation.

The shape of the swiveling portion will allow the clips 14 to spread themselves apart from one another as the animals move about and allow for some freedom of movement of the animals laterally from the clamp. Those two corners 6 of the swivel where the base meets the sides are preferably rounded in order to prevent the clips from riding up on the clamp toward the top of this portion.

It is thought that without such a shape for the clamp, the clips or other connecting means would likely move upward toward the top side and so entangle the sub lines with one another. This could happen after, say, one of the clips (with the sub line) moves upward toward the top side 3. After it does, the animal may then move laterally and so cross his sub line with those of the other dogs at this swiveling point. The sub lines will thus start to entangle with one another at the swiveling point.

If there is enough entanglement at that point, this could prevent the swiveling action all together as the lines that are entangled around the swivel would provide forces opposed to one another and thus prevent rotation of the swivel arrangement in either direction. At the very least, the entanglement at this point is very likely to interfere with the movement of the sub lines.

With the novel shape of the swiveling portion 1, each of the sub lines are urged apart from one another at this end of the swivel. The use of the trapezoidal shape will prevent the connecting clips 14 from riding upward toward the main line as it will be difficult for the force of the dog to go back against this shape. The shape of the rounded corners shown in FIG. 3 will help in this regard. It is still possible that the dogs may cross lines as the clips are strung along the base but if that happens, the swiveling action of 1 and 11 should enable the lines to disentangle from one another should the lines cross. The force of the lines will act as a force to force the swiveling action and this should help to disentangle the lines.

The lines (both the main line and the sub lines) should, preferably, be made of metal or other strong materials that are of sufficient strength to resist the force of the animals that are pulling on the leash. The clamp would also preferably be made of metal or other material that will not wear out quickly in light of the use to which it is put.

The handle end 8 of the invention may include a padded portion in order to allow the handler to be better able to hold the main line that will have multiple animals connected to it. As restraining several animals on one leash is likely to increase the amount of force that will be exerted on the main line, it is thought that the use of a padded portion may be necessary in order to reduce the strain on the hands.

I claim:

1. An improved leash for holding multiple animals with separate lines, said leash comprising: a main line having two ends, one of said ends having a handle and the other in connection with a swiveling connection, said swiveling connection having a roughly trapezoidal shape and having a top side, a base side and two lateral sides, said lateral sides of about equal length and said top side of smaller length than said base side, said base side and each of said lateral sides connected to one another at a corner, said corners of curved construction so as to urge said sub lines from riding toward said top side. at least two sub lines in connection with said swivel, each of said sub lines having a ring shaped link in connection with said base side and having a line extending from said ring shaped link, each of said sub lines having an animal engaging means.

* * * * *